US009541940B2

(12) United States Patent
Deng et al.

(10) Patent No.: US 9,541,940 B2
(45) Date of Patent: Jan. 10, 2017

(54) INTERFACE SUPPLY CIRCUIT

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Jun-Yi Deng, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/682,646

(22) Filed: Apr. 9, 2015

(65) Prior Publication Data

US 2016/0274612 A1 Sep. 22, 2016

(30) Foreign Application Priority Data

Mar. 18, 2015 (CN) .......................... 2015 1 0118461

(51) Int. Cl.
*G06F 1/32* (2006.01)
*G06F 11/30* (2006.01)
*G05F 3/02* (2006.01)

(52) U.S. Cl.
CPC ....................................... *G05F 3/02* (2013.01)

(58) Field of Classification Search
CPC ............ G05F 3/02; G06F 1/32; G06F 1/3287; G06F 11/3051
See application file for complete search history.

(56) References Cited

U.S. PATENT DOCUMENTS 7,624,303 B2 * 11/2009 Burkland .................. G06F 1/30 324/500
2014/0095916 A1 * 4/2014 Chen ..................... G06F 1/3253 713/324

* cited by examiner

*Primary Examiner* — Jeffrey Zweizig
(74) *Attorney, Agent, or Firm* — Zhigang Ma

(57) ABSTRACT

An interface supply circuit includes a power supply unit, a control unit coupled to the power supply unit, and a detection unit coupled to the control unit. The detection unit is configured to couple to an interface. The detection unit is configured to output a first control signal upon detecting that a device is inserted into the interface and output a second control signal upon detecting that no device is inserted into the interface. The control unit is configured to be switched on upon receiving the first control signal. The power supply unit is configured to supply power to the interface in event that the control unit is switched on. The power supply unit is configured to be disconnected from the interface in event that the control unit receives the second control signal.

15 Claims, 2 Drawing Sheets

INTERFACE SUPPLY CIRCUIT

FIELD

The subject matter herein generally relates to power supply circuits.

BACKGROUND

Some interfaces are mounted in a motherboard. A power supply unit supplies power to the interfaces. A corresponding device is configured to be inserted into an interface, for example, a PCIe device can be inserted into the PCIe interface.

BRIEF DESCRIPTION OF THE DRAWINGS

Implementations of the present technology will now be described, by way of example only, with reference to the attached figures.

DETAILED DESCRIPTION

Figure 1:
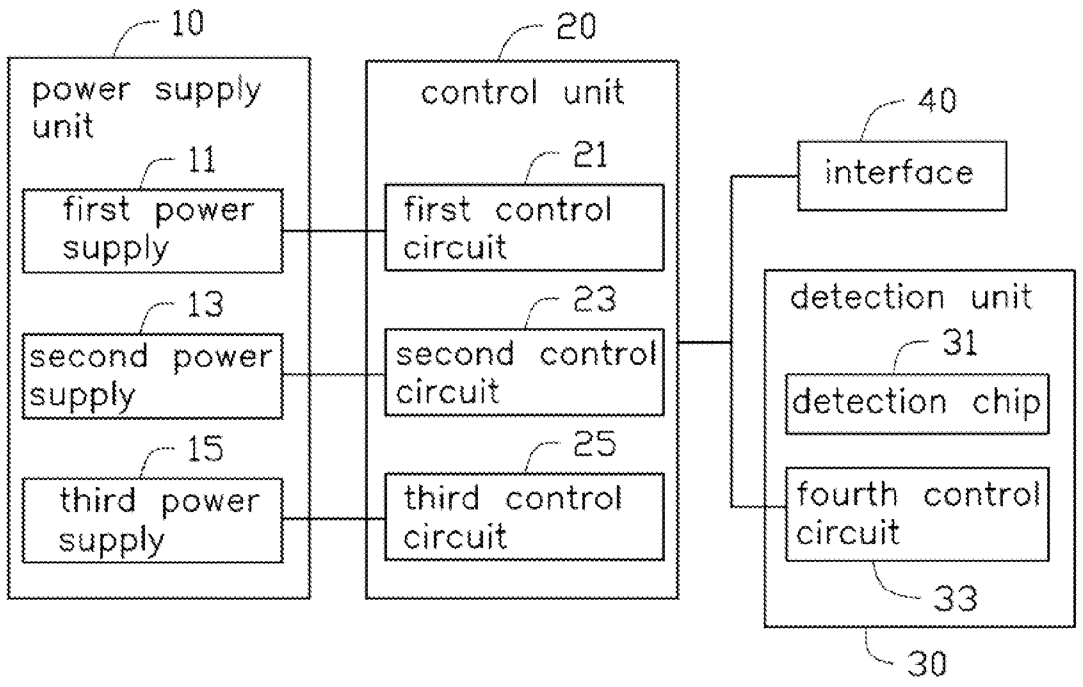
FIG. 1 is a block diagram of one embodiment of an interface supply circuit and an interface.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term “coupled” is defined as connected, whether directly or indirectly through intervening components, and is not necessarily limited to physical connections. The connection can be such that the objects are permanently connected or releasably connected. The term “comprising,” when utilized, means “including, but not necessarily limited to”; it specifically indicates open-ended inclusion or membership in the so-described combination, group, series, and the like.

The present disclosure is described in relation to a power supply circuit which can be used to supply power to a PCIe interface.

FIG. 1 illustrates an embodiment of an interface supply circuit. The interface supply circuit comprises a power supply unit 10, a control unit 20, and a detection unit 30. The power supply unit 10 is configured to supply power to an interface 40 via the control unit 20. In one embodiment, the interface 40 is a PCIe interface and is configured to receive a PCIe device.

The power supply unit 10 comprises a first power supply 11, a second power supply 13, and a third power supply 15. In one embodiment, the first power supply 11 is configured to provide a 3V voltage, the second power supply 13 is configured to provide a 3V voltage, and the third power supply 15 is configured to provide a 12V voltage.

The control unit 20 comprises a first control circuit 21, a second control circuit 23, and a third control circuit 25.

The detection unit 30 comprises a detection chip 31 and a fourth control circuit 33. In one embodiment, the detection chip 31 is a PCH chip and is configured to detect whether the interface 40 receives a PCIe device.

Figure 2:
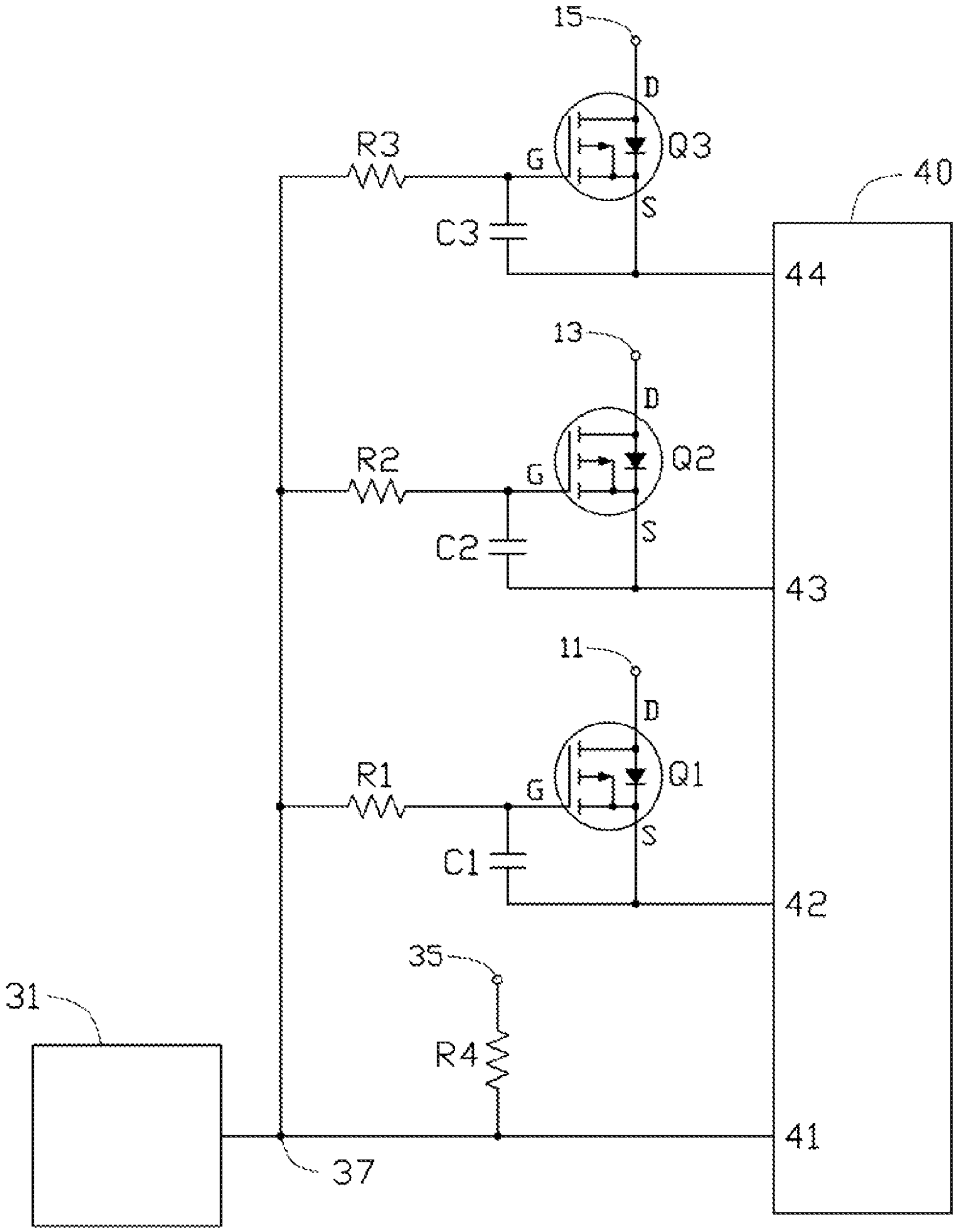
FIG. 2 is a circuit diagram of the interface supply circuit and the interface of FIG. 1.

FIG. 1 and FIG. 2 illustrate that the first control circuit 21 comprises a first field effect transistor (FET) Q1, a first resistor R1, and a first capacitor C1. The second control circuit 23 comprises a second FET Q2, a second resistor R2, and a second capacitor C2. The third control circuit 25 comprises a third FET Q3, a third resistor R3 and a third capacitor C3. Each of the first FET Q1, the second FET Q2, and the third FET Q3 comprises a control terminal G, a first connecting terminal S, and a second connecting terminal D.

The fourth control circuit 33 comprises a fourth resistor R4 and a fourth power supply 35.

The interface 40 comprises a control pin 41, a first power supply pin 42, a second power supply pin 43, and a third power supply pin 44.

The detection chip 31 is coupled to a node 37. The node 37 is coupled to one end of the fourth resistor R4. The other end of the fourth resistor R4 is coupled to the fourth power supply 35. The node 37 is coupled to the control pin 41 of the interface 40. The node 37 is coupled to one end of the first resistor R1. The other end of the first resistor R1 is coupled to the control terminal G of the first FET Q1. The control terminal G of the first FET Q1 is coupled to the first connecting terminal S of the first FET Q1 via the first capacitor C1. The second connecting terminal D of the first FET Q1 is coupled to the first power supply 11. The first connecting terminal S of the first FET Q1 is coupled to the first power supply pin 42 of the interface 40.

The node 37 is coupled to one end of the second resistor R2. The other end of the second resistor R2 is coupled to the control terminal G of the second FET Q2. The control terminal G of the second FET Q is coupled to the first connecting terminal S of the second FET Q2 via the second capacitor C2. The second connecting terminal D of the second FET Q2 is coupled to the second power supply 13. The first connecting terminal S of the second FET Q2 is coupled to the second power supply pin 43 of the interface 40.

The node 37 is coupled to one end of the third resistor R3. The other end of the third resistor R3 is coupled to the control terminal G of the third FET Q3. The control terminal G of the third FET Q3 is coupled to the first connecting terminal S of the third FET Q3 via the third capacitor C3. The second connecting terminal D of the second FET Q2 is coupled to the third power supply 15. The first connecting terminal S of the third FET Q3 is coupled to the third power supply pin 44 of the interface 40.

In one embodiment, each of the first FET Q1, the second FET Q2, and the third FET Q3 is an n-channel FET, each control terminal G is a gate terminal, each first connecting terminal S is a source terminal, and each second connecting terminal D is a drain terminal.

A working principle of the interface supply circuit is as follows. When the detection chip 31 detects a PCIe device is inserted into the interface 40, the detection unit 30 outputs a first control signal. The first FET Q1, the second FET Q2, and the third FET Q3 are switched on after receiving the first control signal. The first power supply 11, the second power supply 13, and the third power supply 15 supply power to the interface 40. When the detection chip 31 detects no PCIe device is inserted into the interface 40, the detection unit 30 outputs a second control signal. The first FET Q1, the second FET Q2, and the third FET Q3 are switched off after receiving the second control signal. The first power supply 11, the second power supply 13, and the third power supply 15 do not supply power to the interface 40, thereby decreasing power and preventing short circuit when conductive materials drop into the interface 40. In one embodiment, the first control signal is a high level signal and the second control signal is a low level signal.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. An interface supply circuit comprising:

a power supply unit;

a control unit coupled to the power supply unit; and a detection unit couplable to an interface;

wherein the detection unit is configured to:

output a first control signal upon detecting that a device is inserted into the interface; and output a second control signal upon detecting that no device is inserted into the interface;

wherein the control unit is configured to be switched on upon receiving the first control signal; and wherein the power supply unit is configured to:

supply power to the interface in event that the control unit is switched on; and be disconnected from the interface in event that the control unit receives the second control signal;

wherein the control unit comprises a first control circuit configured to couple to the interface, the power supply unit comprises a first power supply coupled to the first control circuit, the first control circuit is configured to be switched on after receiving the first control signal, the first power supply is configured to supply power to the interface after the first control circuit is switched on, and the first power supply is configured to be disconnected from the interface after the first control circuit receive the second control signal;

wherein the first control circuit comprises a first field effect transistor (FET), the first FET comprises a control terminal, a first connecting terminal, and a second connecting terminal, the control terminal of the first FET is coupled to the detection unit, the first connecting terminal of the first FET is configured to couple to the interface, and the second connecting terminal of the first FET is coupled to the first power supply;

wherein the first control circuit further comprises a first resistor and a capacitor, one end of the first resistor is coupled to the detection unit, the other end of the first resistor is coupled to the control terminal of the first FET, and the capacitor is coupled between the control terminal of the first FET and the first connecting terminal of the first FET.

2. The interface supply circuit of claim 1, wherein the detection unit comprises a detection chip configured to couple to the interface, the detection chip is configured to detect whether the device is inserted into the interface, and the first resistor is coupled between the detection chip and the control terminal of the first FET.

3. The interface supply circuit of claim 2, wherein the detection unit further comprises a second resistor coupled to the detection chip and the second resistor is coupled to the first resistor.

4. The interface supply circuit of claim 1, wherein the control unit further comprises a second control circuit configured to couple to the interface, the power supply unit further comprises a second power supply coupled to the second control circuit, the second control circuit is configured to be switched on after receiving the first control signal, the second power supply is configured to supply power to the interface after the second control circuit is switched on, and the second power supply is configured to be disconnected from the interface after the second control circuit receive the second control signal.

5. The interface supply circuit of claim 4, wherein the second control circuit comprises a second FET, the second FET comprises a control terminal, a first connecting terminal, and a second connecting terminal, the control terminal of the second FET is coupled to the detection unit, the first connecting terminal of the second FET is configured to couple to the interface, and the second connecting terminal of the first FET is coupled to the second power supply.

6. The interface supply circuit of claim 1, wherein the second control is a high level signal.

7. The interface supply circuit of claim 1, wherein the interface is a PCIe interface.

8. An interface supply circuit comprising:

a detection unit couplable to an interface;

a control unit coupled to the detection unit; and a power supply unit coupled to the control unit;

wherein the detection unit is configured to:

output a first control signal upon detecting that a device is inserted into the interface; and output a second control signal upon detecting that no device is inserted into the interface;

wherein the control unit is configured to:

be switched on upon receiving the first control signal; and be switched off after receiving the second control signal; and wherein the power supply unit is configured to:

supply power to the interface in event that the control unit is switched on; and not supply power to the interface in event that the control unit is switched off;

wherein the control unit comprises a first control circuit and a second control circuit, the first control circuit and the second control circuit are configured to couple to the interface, the power supply unit comprises a first power supply coupled to the first control circuit and a second power supply coupled to the second control circuit, the first control circuit and the second control circuit are configured to be switched on after receiving the first control signal and be switched off after receiving the second control signal, the first power supply is configured to supply power to the interface after the first control circuit is switched on, the second power supply is configured to supply power to the interface after the second control circuit is switched on, and the first power supply and the second power supply are configured to be disconnected from the interface after the first control circuit and the second control circuit are switched off;

wherein the first control circuit comprises a first FET, the first FET comprises a control terminal, a first connecting terminal, and a second connecting terminal, the control terminal of the first FET is coupled to the detection unit, the first connecting terminal of the first FET is configured to couple to the interface, and the second connecting terminal of the first FET is coupled to the first power supply;

wherein the first control circuit further comprises a first resistor and a capacitor, one end of the first resistor is coupled to the detection unit, the other end of the first resistor is coupled to the control terminal of the first FET, and the capacitor is coupled between the control terminal of the first FET and the first connecting terminal of the first FET.

9. The interface supply circuit of claim 8, wherein the detection unit comprises a detection chip configured to couple to the interface, the detection chip is configured to detect whether the device is inserted into the interface, and the first resistor is coupled between the detection chip and the control terminal of the first FET.

10. The interface supply circuit of claim 9, wherein the detection unit further comprises a second resistor coupled to the detection chip and the second resistor is coupled to the first resistor.

11. The interface supply circuit of claim 9, wherein the detection chip is a PCH chip.

12. The interface supply circuit of claim 8, wherein the first FET is an n-channel FET, the control terminal of the first FET is a gate terminal, the first connecting terminal of the first FET is a source terminal, and the second connecting terminal of the first FET is a drain terminal.

13. The interface supply circuit of claim 8, wherein the second control circuit comprises a second FET, the second FET comprises a control terminal, a first connecting terminal, and a second connecting terminal, the control terminal of the second FET is coupled to the detection unit, the first connecting terminal of the second FET is configured to couple to the interface, the second connecting terminal of the first FET is coupled to the second power supply.

14. The interface supply circuit of claim 8, wherein the first control signal is a low level signal.

15. An interface supply circuit comprising:

a power supply unit;

a control unit coupled to the power supply unit; and a detection unit couplable to an interface;

wherein the detection unit is configured to:

output a first control signal upon detecting that a device is inserted into the interface; and output a second control signal upon detecting that no device is inserted into the interface;

wherein the control unit is configured to be switched on upon receiving the first control signal; and wherein the power supply unit is configured to:

supply power to the interface in event that the control unit is switched on; and be disconnected from the interface in event that the control unit receives the second control signal;

wherein the control unit comprises a first field effect transistor (FET), the first FET comprises a control terminal, a first connecting terminal, and a second connecting terminal, the control terminal of the first FET is coupled to the detection unit, the first connecting terminal of the first FET is configured to couple to the interface, and the second connecting terminal of the first FET is coupled to the power supply;

wherein the first control circuit further comprises a first resistor and a capacitor, one end of the first resistor is coupled to the detection unit, the other end of the first resistor is coupled to the control terminal of the first FET, and the capacitor is coupled between the control terminal of the first FET and the first connecting terminal of the first FET.

* * * * *